Nov. 23, 1948.                L. R. TALLMAN                2,454,413
                                  BALER
Original Filed May 10, 1944                       2 Sheets-Sheet 1
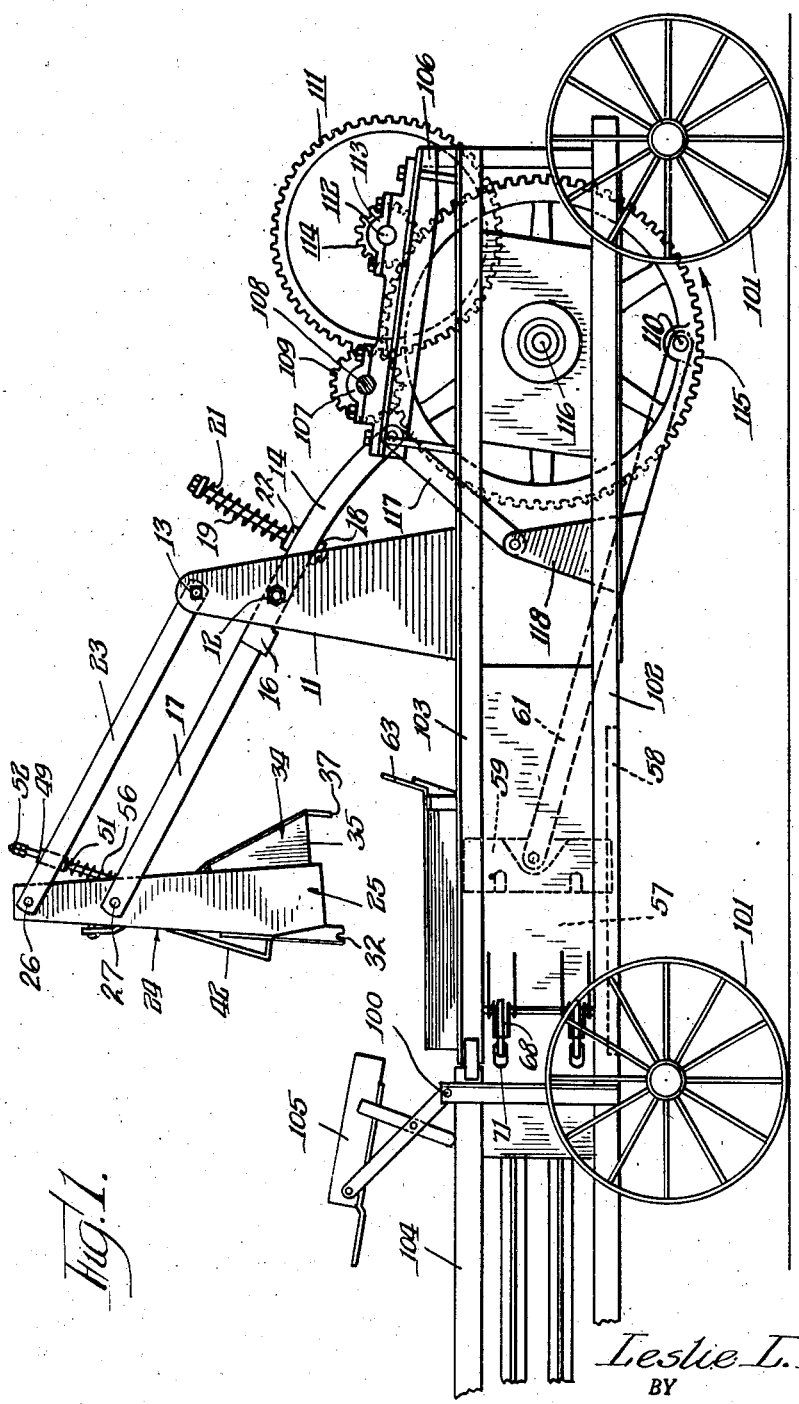
INVENTOR.
Leslie L. Tallman
BY
Moon, Olson & Trexler
attys.

Nov. 23, 1948.  L. R. TALLMAN  2,454,413
BALER
Original Filed May 10, 1944  2 Sheets-Sheet 2
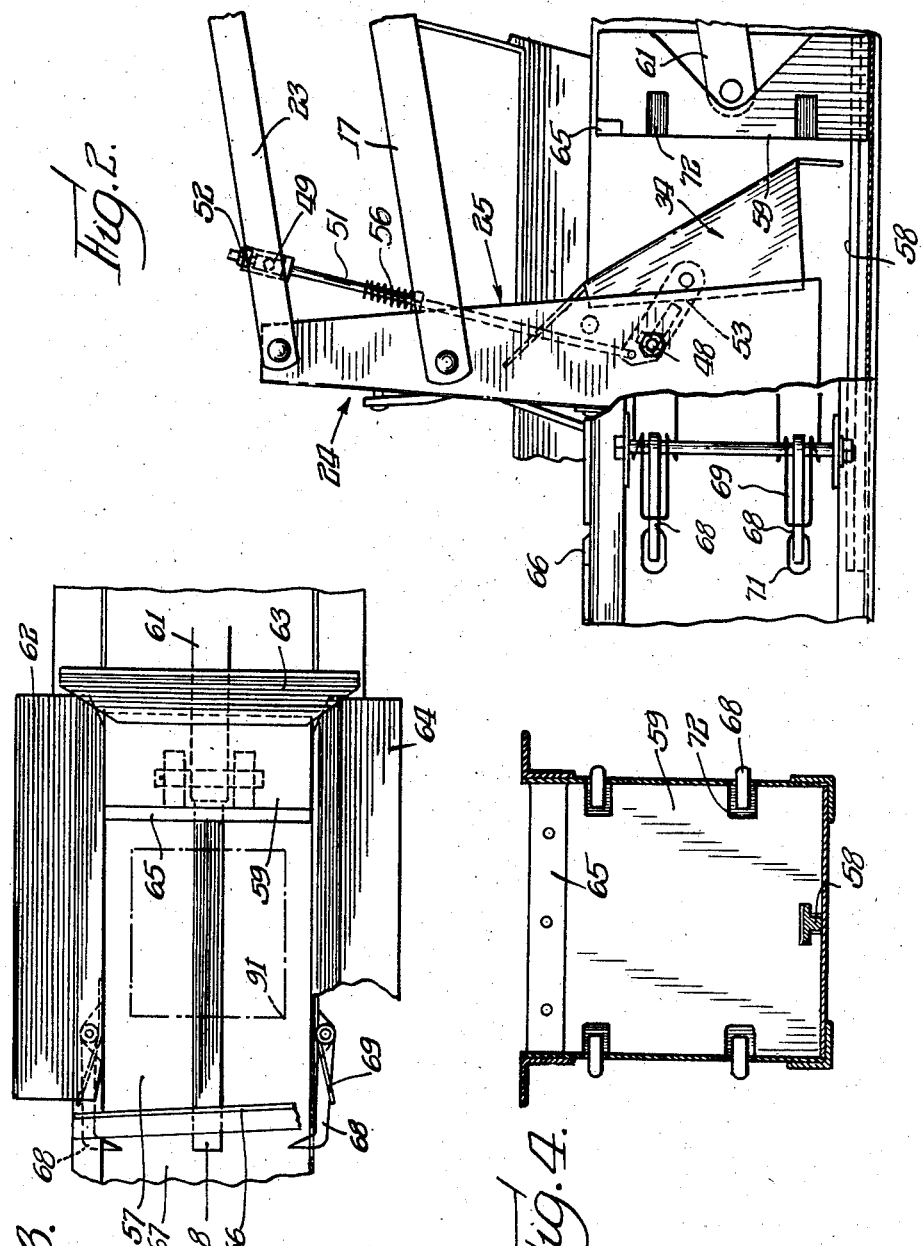
INVENTOR.
Leslie R. Tallman Patented Nov. 23, 1948

2,454,413

UNITED STATES PATENT OFFICE 2,454,413

BALER

Leslie R. Tallman, Shelbyville, Ill., assignor of forty-five per cent to G. L. Tallman, twelve and one-half per cent to J. L. Tallman, and twelve and one-half per cent to Emma S. Tallman, all of Shelbyville, Ill.

Original application May 10, 1944, Serial No. 534,869. Divided and this application February 18, 1946, Serial No. 648,470

5 Claims. (Cl. 100—19)

The present invention relates to a baler and more particularly to a unique construction of the compression chamber in a baler of the type commonly used for baling hay, straw, and similar types of material.

The present invention is a division of my application for collapsible feeder head for balers, Serial Number 534,869, filed May 10, 1944.

In accordance with the present invention many of the disadvantages heretofore inherent in balers are overcome by providing an improved feeder head which has a maximum area of engagement with a charge of material. To retain the charge of material within the chamber when the feeder head moves upwardly in a return cycle of operation, the bottom of the compression chamber is provided with a plunger guide means which aids material engaging dogs which project through the sides of the baling case just beyond the limit of movement of the compression plunger.

It is, therefore, an object of the present invention to provide an improved construction for a compression chamber.

Other and further objects of the present invention subsequently will become apparent by reference to the following description taken in connection with the accompanying drawing wherein Figure 1 is a side elevation of a baler constructed in accordance with the present invention;

Figures 2 and 3 are views of a generally schematic nature to illustrate the mode of operation of the feeder head shown in Figure 1; and Figure 4 is a front view of the plunger head as seen from a cross section of the baler in the proximity of the junction between the compression chamber and the bale case.

To facilitate the understanding of the invention as it would appear in its normal environment in connection with a hay baler or other baler of conventional type, there is shown in Figure 1 the invention as applied to one of the smaller and simpler types of balers. This application to one of the simpler types of balers has been shown in the drawing to facilitate the disclosure although it is to be understood that the present invention is equally applicable to the more complex types of balers including self-powered balers, and pick-up balers.

From the showing in Figure 1 it, therefore, may be assumed that the present invention has been applied to one of the smaller types of balers which is hand fed and which is powered from a suitable auxiliary source of power connected thereto by a belt. Such baler is usually arranged for movement from place to place, and hence is provided with a plurality of wheels 101 mounted on axles which support the frame of the baler. The frame of the baler primarily is delineated by two bottom rails 102 and two top rails 103 each of which more commonly is of angle iron configuration. The top rails 103 and the bottom rails 102 are suitably retained in position by a plurality of top, bottom, and side members, some of which have been omitted from the drawing for the purpose of illustrating more clearly other mechanism. The main baler frame supports at one end a bale case 104 in which the formed bales move toward the exit and in which the ties about the bales are completed by manual operation. Supported at the juncture between the bale case 104 and the main frame is a block holder 105 which is pivotally supported at 100 so that when the block holder is tilted toward the frame, the block held thereby will be in position for engagement by a block engaging member 42 of a feeder head 24.

The main frame supports upright support members 11 which carry a pair of feeder arm levers 14 and 17, and guide arm levers 23. The collapsible feeder head 24 is supported at the outer extremities of these two sets of pairs of arms. Mounted above the top rail 103 of the baler frame is an auxiliary frame 106 which has a bearing 107 on either side to support a shaft 108 which carries a gear 109. The shaft 108 is provided at one side with a pulley and a fly-wheel not shown in the drawing for purposes of clarity in the disclosure of the other cooperating elements. The gear 109 engages a large gear 111 mounted upon a shaft 112 supported in a bearing 113. The bearing 113 is supported from the auxiliary frame 106. The shaft 112 carries a pair of gears 114 each of which engages one of a pair of large gears 115 which are mounted upon a pair of shafts 116. A crank shaft 116, or an equivalent structure, is mounted between the gears 115 and is connected to one end of a pitman 61 which is connected to a piston 59. At an intermediate point on the pitman there is positioned an upright member 118 which is connected to a short connection link or lever 117, the other end of which is connected to the lower extremity of the feeder arm levers 14. A material compression chamber 57 is provided adjacent its bottom with a guide member 58, also shown in Figures 2, 3 and 4, which extends a short distance beyond the end of the compression chamber to retain in engagement the piston or compression plunger 59. Adjacent the upper portion of the compression chamber 57 flared side members including members 62, 63 and 64 are provided to assist the passage of material into the compression chamber.

In the sides are located dogs 68 which are resiliently biased by springs 69 so that the pointed portions of the dogs extend inwardly into the bale casing through suitable openings or apertures 71. The guide rail 58 mounted in the bottom of the compression chamber 57 terminates in the vicinity of the line inter-connecting the extremities of the dogs 68 so that the end of the rail 58 cooperates to retain in position compressed charges of material such as hay or straw.

From the foregoing it will be seen that the application of power to produce the rotation of the large gears 115 brings about movement of the pitman 61 so that as the plunger 59 moves across the opening of the compression chamber 57, the feeder head is moved upwardly. The position of the parts shown in the drawing in Figure 1 is the position obtaining when the compression plunger 59 or piston is being removed rearwardly since the gears 115 are moving in a counterclockwise direction. Thus the collapsible feeder head 24 has begun its downward movement to engage a charge of material such as hay, straw or the like to be supplied to the compression chamber 57.

The levers 14 are pivotally mounted on a shaft 12 carried by supports 11 and extend a short distance beyond the shaft 12 where they terminate in portions having depending side members 16. Mounted adjacent the levers 14 and on the shaft 12 are a pair of levers 17 which extend upwardly to the feeder head 24 and which extend downwardly in Figure 1 a short distance beyond the shaft 12. Adjacent the lower ends of the levers 17 there is positioned a cross member 18 engaged by a bolt 19 having thereabout a helical spring 21 which in turn engages another cross member 22. The cross members 18 and 22 are arranged to engage both pairs of levers 14 and 17 and the resilient spring 21 about the bolt 19 provides a resilient means for interconnecting the two pair of levers. This resilient interconnecting means is provided so that if during the downward stroke of the feeder head obstruction is encountered, the resilient interconnection comprising a spring 21 will prevent breakage of the mechanism. Mounted on a shaft 13 located at the upper extremity of the upright members 11 are a pair of levers 23 arranged so as to be generally parallel to the levers 17. The pairs of levers 17 and 23 are connected to a collapsible feeder head indicated by pivotal connections 27 and 26 respectively.

The collapsible feeder head 24 is formed of a plurality of sections 25 and 34 so that during a portion of the cycle of operation of the feeder head a large area of a charge of material supplied to a compression chamber in a baler may be engaged, and subsequently during another portion of the cycle of operation the feeder head will occupy a minimum of space or volume. One manner of constructing the feeder head 24 is illustrated in Figures 1 and 2 of the original patent application, Serial Number 534,869, filed May 10, 1944.

The feeder head portion 25 has a notched material engaging edge member 32. The other feeder head portion has two trapezoidal side members 35 secured to the rear member 37. The portion 34 is pivotally carried by portion 25 and is held in expanded position by a locking member 53. The locking member 53 is carried by a transverse shaft 48 mounted in the head portion 25. A rod 51 is connected to the locking member 53, and the rod is pivotally connected to a pivoted sleeve bearing 49 of the lever 23. The upper extremity of the rod 51 carries lock nuts 52 which in one position engage the bearing 49. A spring 56 surrounds the rod 51 and in one position engages the underside of bearing 49.

By referring to Figures 2, 3 and 4, it will be seen that the guide member 58 has a generally T-shaped cross sectional configuration. The plunger 59 is provided adjacent its upper foremost corner extremity with a shear bar 65 arranged to cooperate with another shear bar or knife 66 which preferably is mounted on the members 103 at a slight angle to a line perpendicular to the transverse axis of the baling chamber and bale case.

The compression plunger 59 moves forwardly so that the cutter bar 65 passes underneath the cooperating cutting bar or knife 66, and hence it will be seen that the forward face of the plunger 59 extends just beyond the extremities of the dogs 68. To provide for such passage of the plunger 59 to this point, the plunger is provided on each side with suitable recesses 72.

From Figure 4 it will be seen how the guide rail 58 retains in position the plunger 59 without the use of any devices adjacent the top surface of the plunger 59 which otherwise might restrict the opening to the compression chamber. The advantage of this additional space into which to supply a charge of material to the chamber 57 has been found particularly valuable in the case of materials such as soy beans which are being baled for fodder, since the additional area provided in the opening together with the additional area engaged by the expanded feeder head produces a highly desirable operation. The action of the cutter bars 65 and 66 also produces a clean separation of each charge of such material so that when it is desired to open a bale and feed material such as soy beans, it is possible to progressively use the bale without breaking the entire bale and scattering it about prior to obtaining one or two forks of material. In Figure 3 the dotted line representation 91 generally indicates the area of the feeder head 24 when it is substantially in collapsed condition.

In view of the detailed description of the operation of the various components comprising the invention, it is believed that it will be apparent to those skilled in the art how the various elements shown in Figure 1 cooperate when applied to a baler.

While for the purpose of illustrating and describing the present invention, certain specific embodiments have been shown in the drawings, it is to be understood that the invention is not to be limited thereby since obviously the invention is susceptible to such other embodiments and variations as may be commensurate with the spirit and scope of the invention as defined in the appended claims.

This invention is hereby claimed as follows:

1. In a baler, the combination comprising a compression chamber, a reciprocating plunger therefor, guide means for said plunger mounted adjacent the bottom of said chamber and extending above the bottom and terminating at the forward limit of travel of said plunger whereby the end of said guide means will operate to retain in position compressed material, a shear bar mounted on the upper edge of said plunger, and a cooperating shear bar mounted adjacent said chamber at a slight angle to said first shear bar.

2. In a baler, the combination comprising a compression chamber, a reciprocating plunger therefor, a guide rail for said plunger centrally mounted in the bottom of said chamber and extending above the bottom and terminating at the forward limit of travel of said plunger whereby the end of said guide rail will operate to retain in position compressed material, a shear bar mounted on the upper edge of said plunger, and a cooperating shear bar mounted adjacent said chamber at a slight angle to said first shear bar.

3. In a baler, the combination comprising a compression chamber, a reciprocating plunger therefor, a guide rail for said plunger, said guide rail having a T-cross section and being centrally mounted in the bottom of said chamber so as to extend above the bottom thereof and terminate at the forward limit of travel of said plunger whereby the end of said guide rail will operate to retain in position a compressed charge of material, a shear bar mounted on the upper edge of said plunger, and a cooperating shear bar mounted adjacent said chamber at a slight angle to said first shear bar.

4. In a baler, the combination comprising a compression chamber, a bale case extending beyond said compression chamber, a plurality of resiliently biased dogs mounted in the sides of said bale case so as to extend inwardly substantially to the junction between said compression chamber and said bale case, a reciprocating plunger therefor having at its bottom edge a T-shaped slot, and a guide rail for cooperation with the T-shaped slot of said plunger, said guide rail having a T-shaped cross section and being centrally mounted in the bottom of said chamber so as to extend above the bottom thereof and terminate at the forward limit of travel of said plunger, whereby the end of said guide rail will cooperate with said resiliently biased dogs to retain in position a charge of compressed material.

5. In a baler, the combination comprising a compression chamber, a bale case extending beyond said compression chamber, a plurality of resiliently biased dogs mounted in the sides of said bale case so as to extend inwardly at the junction between said compression chamber and said bale case, a reciprocating plunger for said compression chamber and having at its bottom edge a guide rail slot, and a guide rail for cooperation with the slot of said plunger, said guide rail being centrally mounted in the bottom of said chamber so as to extend above the bottom thereof and terminate at the forward limit of travel of said plunger, whereby the end of said guide rail will cooperate with said resiliently biased dogs to retain in position a charge of compressed material.

LESLIE R. TALLMAN.

REFERENCES CITED

The following references are of record in the file of this patent:

UNITED STATES PATENTS

| Number | Name | Date |
|---|---|---|
| 440,260 | Freel | Nov. 11, 1890 |
| 1,215,014 | Fleming et al. | Feb. 6, 1917 |

FOREIGN PATENTS

| Number | Country | Date |
|---|---|---|
| 525,349 | Germany | May 22, 1931 |